(12) United States Patent
Schlesener et al.

(10) Patent No.: US 7,447,194 B1
(45) Date of Patent: Nov. 4, 2008

(54) APPLICATION SERVER UPDATE MESSAGE PROCESSING

(75) Inventors: Matthew C. Schlesener, Olathe, KS (US); Pallavur A. Sankaranaraynan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 702 days.

(21) Appl. No.: 10/935,877

(22) Filed: Sep. 8, 2004

(51) Int. Cl.
*H04L 12/28* (2006.01)

(52) U.S. Cl. ................................ 370/352; 370/401

(58) Field of Classification Search ............... 358/402; 370/229, 352; 379/201.01
See application file for complete search history.

(56) References Cited

U.S. PATENT DOCUMENTS

| | | | | |
|---|---|---|---|---|
| 6,832,254 B1* | 12/2004 | Scoggins et al. | ............. | 709/227 |
| 6,856,676 B1* | 2/2005 | Pirot et al. | ............. | 379/201.01 |
| 6,885,658 B1* | 4/2005 | Ress et al. | ................... | 370/352 |
| 6,944,280 B2* | 9/2005 | Suzuki | ........................ | 379/229 |
| 7,095,836 B2* | 8/2006 | Wengrovitz | ............ | 379/201.01 |
| 7,177,304 B1* | 2/2007 | Mo et al. | ..................... | 370/356 |
| 7,203,186 B1* | 4/2007 | Fuller et al. | .................. | 370/352 |
| 7,280,530 B2* | 10/2007 | Chang et al. | ................. | 370/352 |
| 2003/0076815 A1* | 4/2003 | Miller et al. | ................. | 370/352 |
| 2003/0118008 A1* | 6/2003 | Baumann et al. | ............ | 370/352 |
| 2003/0193696 A1* | 10/2003 | Walker et al. | ............... | 358/402 |
| 2004/0264482 A1* | 12/2004 | Kang et al. | .................. | 370/401 |

OTHER PUBLICATIONS

Schlesener, Matthew C., Performance Evaluation of Telephony Routing over IP (TRIP), B.S.E.E. Kansas State University, Fall 1996, submitted to the Department of Electrical Engineering and Computer Science and the Faculty of the Graduate School of the University of Kansas in partial fulfillment of the requirements for the degree of Master's of Science.

* cited by examiner

*Primary Examiner*—Hassan Kizou
*Assistant Examiner*—Emmanuel Maglo

(57) ABSTRACT

A media gateway controller in a packet communication network. The media gateway controller comprises an interface configured to receive a first plurality of update messages from a first plurality of application servers of a first enterprise network and receive a second plurality of update messages from a second plurality of application servers of a second enterprise network wherein the update messages indicate the status of the application servers. The media gateway controller also includes a processor configured to process the update messages to update a routing table based on the status of the application servers.

16 Claims, 9 Drawing Sheets

APPLICATION SERVER UPDATE MESSAGE PROCESSING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to packet communications, and in particular, to media gateway controller systems, methods of operation, and software for processing application server update messages.

2. Description of the Prior Art

In many enterprises, employees have certain dialing rights. When an employee places a call from his desk phone, an enterprise PBX determines whether the call is allowed based on the rights associated with that employee. The PBX determines the identity of the employee based on the extension of the phone used by the employee for the call. Some employees are granted rights different from other employees. For instance, a high level employee such as a manager is often granted international dialing rights, whereas a low level employee such as a clerk is prohibited from placing international calls.

Also in many enterprises, employees now widely use wireless phones. Often times an enterprise provides employees wireless phone plans from major wireless carriers. However, an enterprise may wish to restrict the use of wireless phones to business use only. Unfortunately, these off-the-shelf plans do not discriminate between personal and business use, and enforcing such a business-use only policy is very difficult. Additionally, applying the same types of dialing plans to wireless phones as applied to desk phones is very difficult.

In some cases, a wireless call can be routed through a PBX. In that manner, the employee making the call can enjoy full access to the suite of services provided by the PBX. For example, the PBX can apply the appropriate dialing rights plan to the call. Unfortunately, such an arrangement can lead to overloading the PBX in circumstances where many wireless callers require access to the PBX. Additionally, routing a call through an enterprise PBX from outside the enterprise utilizes scarce resources such as available ports on the PBX.

SUMMARY OF THE INVENTION

An embodiment of the invention solves the above problems as well as other problems by providing systems, methods, and software that provide improved dialing rights applications for wireless communications users. An embodiment of the invention improves load balancing of application servers in a packet communications network. An embodiment of the invention also improves call routing and call processing functions for calls requiring dialing rights applications.

An embodiment of the invention includes a media gateway controller in a packet communication network. The media gateway controller comprises an interface configured to receive a first plurality of update messages from a first plurality of application servers of a first enterprise network and receive a second plurality of update messages from a second plurality of application servers of a second enterprise network wherein the update messages indicate the status of the application servers. The media gateway controller also includes a processor configured to process the update messages to update a routing table based on the status of the application servers.

In an embodiment of the invention, the interface is further configured to receive a call setup request for a call and transfer a query to either a one of the first plurality of application servers or a one of the second plurality of application servers wherein the call setup request indicates a calling party and a one of the enterprise networks and wherein the query indicates the calling party.

In an embodiment of the invention, the processor is further configured to process the call setup request to select the first plurality of application servers based on the one enterprise network indicated in the call setup request and select the one application server of the first plurality of application servers based on the status of the one application server.

In an embodiment of the invention, the interface is further configured to receive a response from the one application server indicating first instructions for the call and transfer second instructions for the call.

In an embodiment of the invention, the processor is further configured to process the first instructions for the call to determine second instructions for the call.

In an embodiment of the invention, the first instructions indicate that the call is allowed based on a calling plan for the calling party.

In an embodiment of the invention, the second instructions indicate routing instructions for the call.

In an embodiment of the invention, the first instructions indicate that the call is not allowed based on a calling plan for the calling party.

In an embodiment of the invention, the update messages comprise Telephony Routing over Internet Protocol (TRIP) update messages.

In an embodiment of the invention, the routing table comprises a Telephony Routing over Internet Protocol (TRIP) routing table.

BRIEF DESCRIPTION OF THE DRAWINGS

The same reference number represents the same element on all drawings.

DETAILED DESCRIPTION OF THE PREFERRED EMBODIMENT

FIGS. 1-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 1-3

Figure 1:
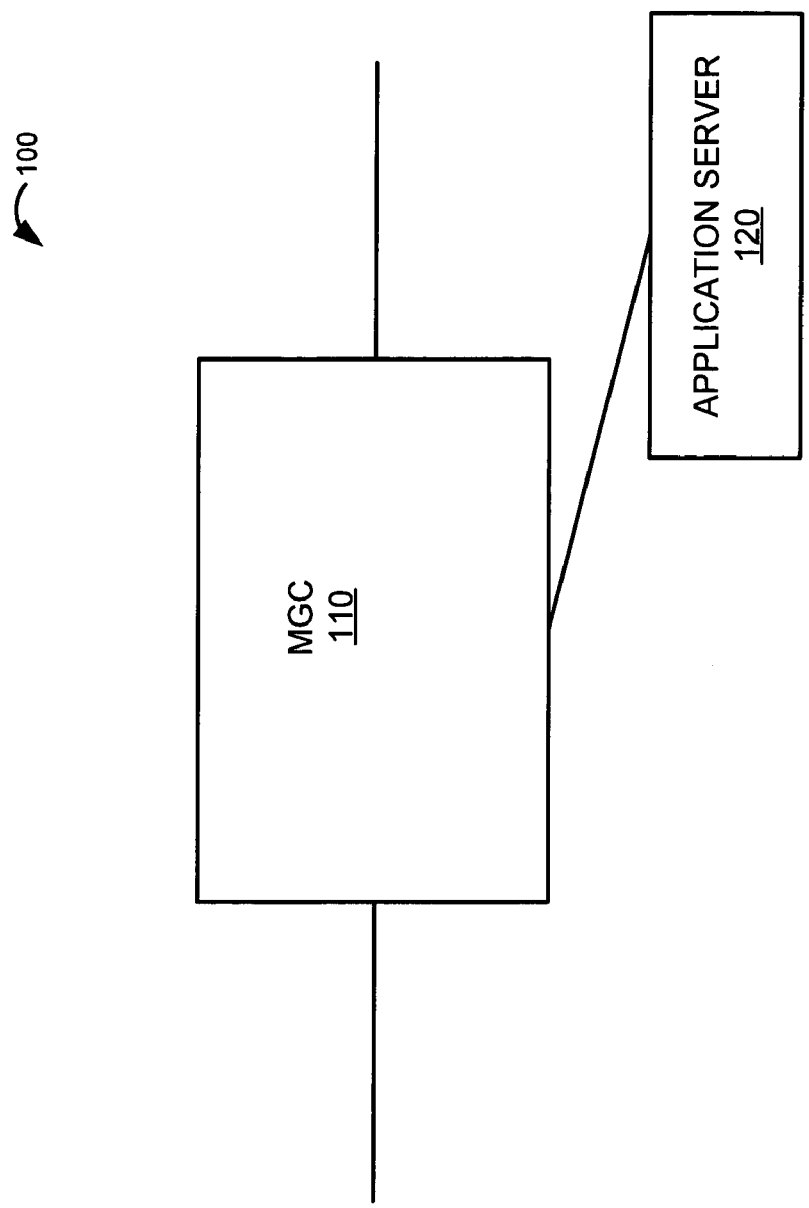
FIG. 1 illustrates a communication network in an embodiment of the invention.

FIG. 1 illustrates communication network 100 in an embodiment of the invention. Communication network 100 includes media gateway controller (MGC) 110 and application server 120. MGC 110 performs control processing functions for a packet communication network. Application server 12 provides an application platform in an enterprise network. Application server 120 is in communication with MGC 110.

Figure 2:
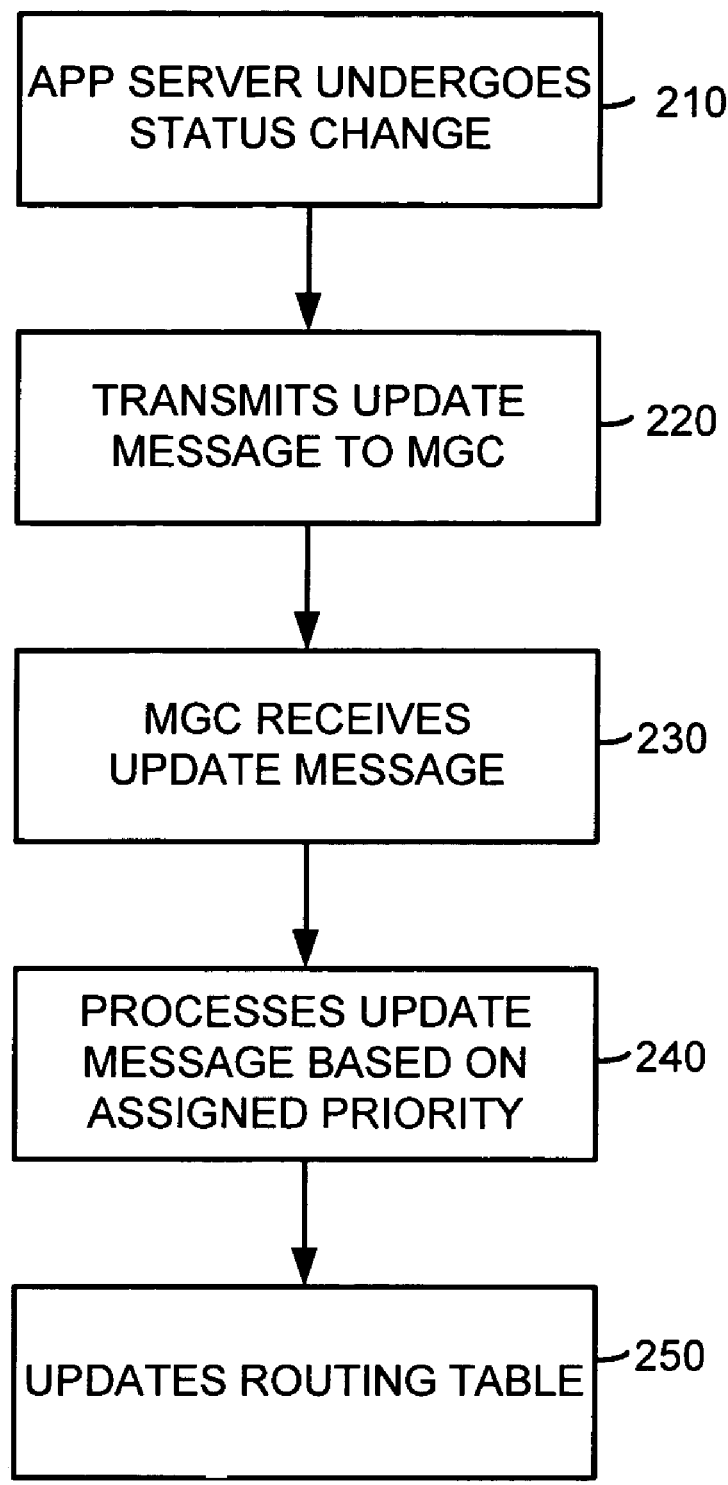
FIG. 2 illustrates the operation of a communication network in an embodiment of the invention.

FIG. 2 illustrates the operation of MGC 110 in an embodiment of the invention. To begin, application server 120 undergoes a status change (Step 210). For instance, the status change could be a failure situation, an increase in capacity, a decrease in capacity, added functionality, as well as other status changes. In response to the status change, application server 120 transmits an update message to MGC 110 (Step 220). The update message identifies application server 120 as well as the status change. MGC 120 receives the update message from application server 120 as well as other update messages from other application servers and gateways (Step 230). The update messages are assigned a priority and processed in order of priority by MGC 110 (Step 240). MGC 110 updates a routing table based on the status of application server 120, the other application servers, and the gateways (Step 250).

Figure 3:
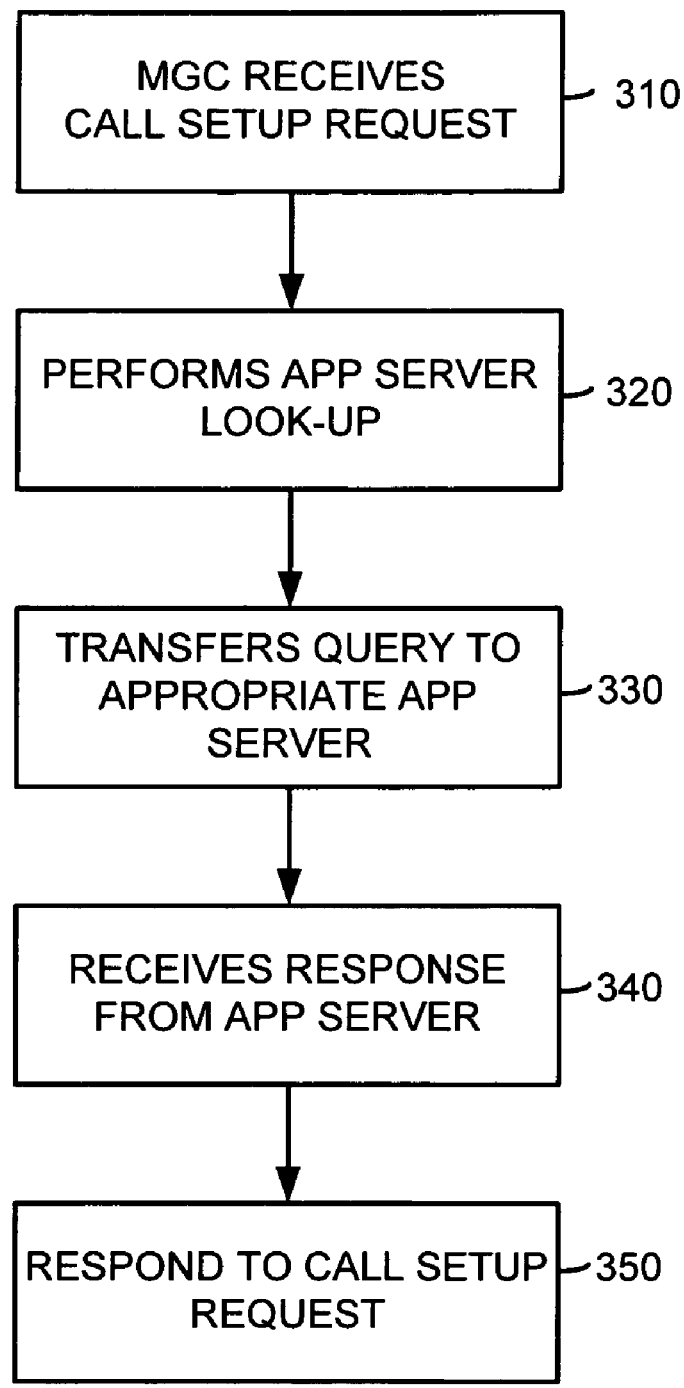
FIG. 3 illustrates the operation of a communication network in an embodiment of the invention.

FIG. 3 also illustrates the operation of MGC 110 in an embodiment of the invention. MGC 110 receives a call setup request (Step 310). The call setup request could be sent by a communication device such as a wireless phone, a personal digital assistant (PDA), as well as other devices. The call request indicates the calling party and an enterprise network. MGC 110 processes the call setup request to choose an application server (Step 320). In some cases, the enterprise network indicated in the call setup request includes more than one application server. Therefore, MGC 110 selects the optimal application server based on the status of each application server. In this example, MGC 110 selects application server 120.

Upon selecting application server 120, MGC 110 transmits a query to application server 120. The query indicates the calling party. Application server 120 receives the query and processes the query to determine if the call setup request is allowed or not allowed. Application server 120 applies a calling plan to the calling party to determine if the call is allowed or not allowed. The calling plan could be, for instance, a dialing rights plan similar to those implemented on PBXs. Upon processing the query, application server 120 transmits first instructions for the call to MGC 110. The first instructions could indicate whether or not the call is allowed. MGC 110 receives the response and transmits second instructions to the origin of the call setup request. For example, if the call is allowed, MGC 110 transmits routing instructions. If the call is not allowed, MGC 110 transmits a call denial instruction.

Advantageously, communication network 100 provides for applying calling plans to wireless communication devices. In some cases, dialing plans can be applied to wireless device users similar to the dialing plans applied to desk phones. Further advantageously, load balancing between application servers can be accomplished based on the status of the application servers. This prevents any application server from being overloaded. In another advantage, communication network 100 improves the security of an enterprise network by having application servers update a central media gateway controller rather than creating security holes between campuses of an enterprise network.

Second Embodiment Configuration and Operation

FIGS. 4-8

Figure 4:
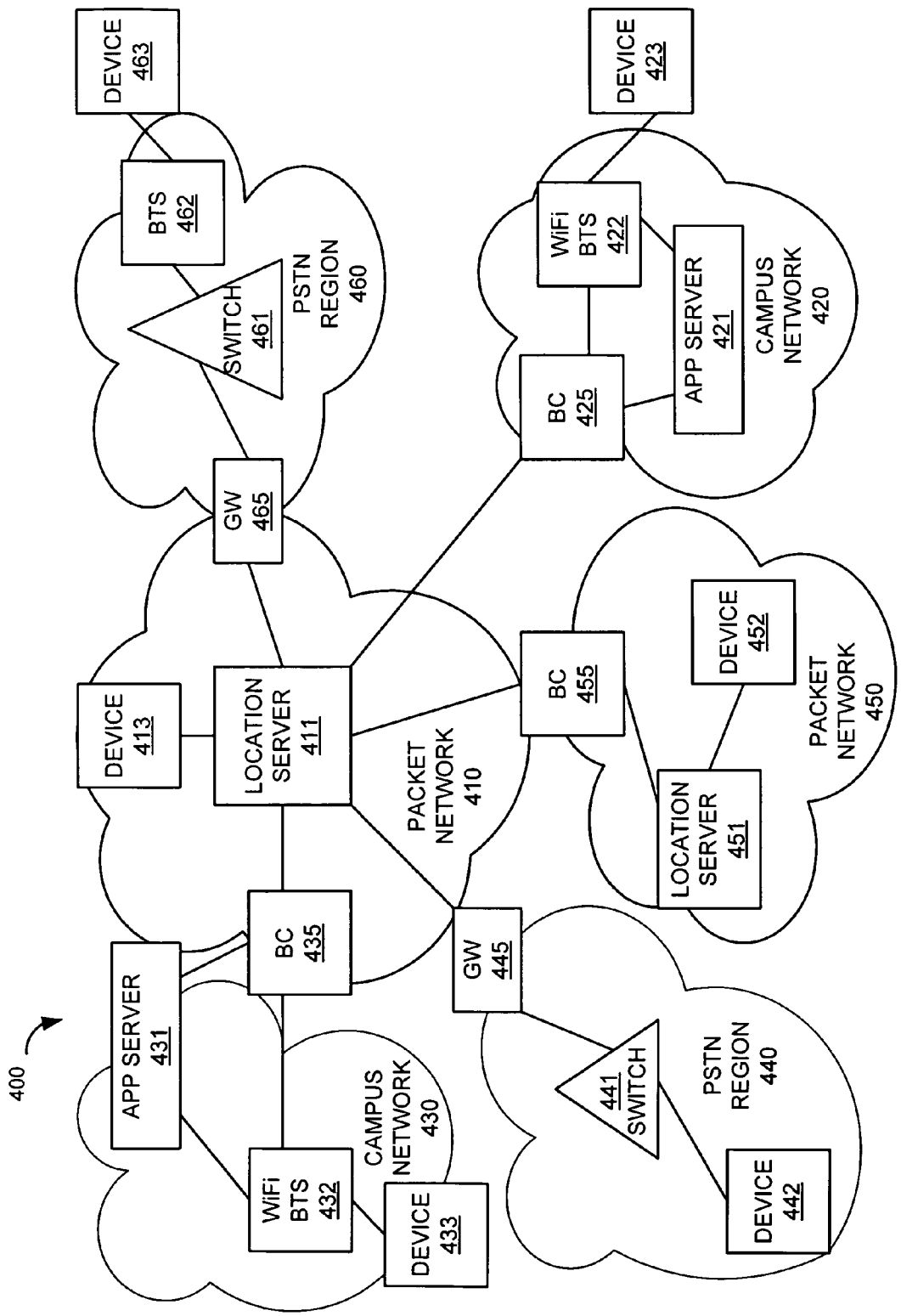
FIG. 4 illustrates a communication network in an embodiment of the invention.

FIG. 4 illustrates communication network 400 in an embodiment of the invention. Communication network 400 includes packet communication network 410, campus network 420, packet communication network 450, public switched telephone network (PSTN) region 440, campus network 430, and PSTN region 460. Campus network 420 is coupled to packet communication network 410 by border controller 425. Packet network 450 is coupled to packet network 410 by border controller 455. PSTN region 440 is coupled to packet network 410 by gateway 445. Campus network 430 is coupled to packet network 410 by border controller 435. PSTN region 460 is coupled to packet network 410.

Campus network 420 includes application server 421, base station transceiver 422, and communication device 423. Packet network 450 includes location server 451 and communication device 452. PSTN region 440 includes switch 441 and device 442. Campus network 430 includes application server 431, base station transceiver 432, and communication device 433. PSTN region 460 includes switch 461, base station transceiver 462, and communication device 463. Packet network 410 includes location server 411 and communication device 413.

In this embodiment of the invention, location server 411 could be running on a session initiation protocol (SIP) proxy. SIP is a well known protocol used for Voice over Internet Protocol (VoIP) call setup. Other protocols include H.323. Location servers are specific instances of what is more generally referred to as media gateway controllers. In this embodiment, location server 411 could be telephony routing over Internet protocol (TRIP) enabled. TRIP is a protocol used for communicating with gateways. For example, gateway 445 could be TRIP enabled. Location server 411 could communicate with gateway 445 using TRIP to monitor the state of gateway 445. Further in this embodiment, location server 451 could be SIP and TRIP enabled. Devices 413, 452, 423, and 433 could also be SIP enabled, as well as enabled for several other wireless protocols. Gateway 465 and border controllers 435 and 425 could be TRIP enabled. Switches 441 and 461 could comprise telecommunication switches well known to those in the art.

Continuing with this embodiment of the invention, several nodes of communication network 400 could experience status changes. For example, gateway 465 could have a trunk failure to switch 461. In response, gateway 465 would transmit a TRIP update message to location server 411 indicating the trunk failure. Location server 411 would process the update message to update stored routing tables. Other changes of status could include an increase in capacity to PSTN region 460, a decrease in capacity to PSTN region 460, entering or leaving a period of congestion, as well as several others. Border controllers 435 and 425, gateway 445, and border controller 455 could experience similar status changes. In response, these network elements would transmit TRIP update messages to locations server 411 indicating the same. TRIP update messages can also indicate general element statistics on a periodic basis rather than indicating a specific status change. For example, TRIP update messages could indicate accounting statistics for a network element as well as general element health statistics.

Further in this embodiment of the invention, campus network 430 and campus network 420 are operated by an enterprise such as a corporation, a university, as well as other types of enterprises. Campus networks 430 and 420 can be operated as a single enterprise network. In this embodiment, application servers 431 and 421 provide calling plan applications, such as a dialing rights plan. Application server 431 transmits TRIP update messages to border controller 435 indicating its health and status. Similarly, application server 421 transmits TRIP update messages to border controller 425 indicating its health and status.

Figure 5:
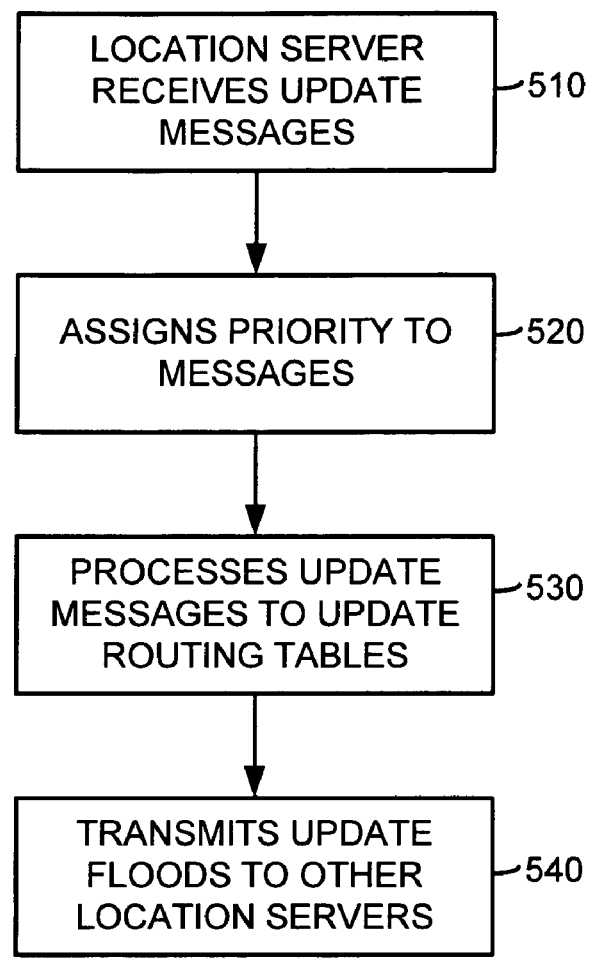
FIG. 5 illustrates the operation of a communication network in an embodiment of the invention.

FIG. 5 illustrates the operation of communication network 400 in an embodiment of the invention. In this embodiment, application server 431 experiences a failure and transmits an update message to border controller 435. Border controller 435 transmits a TRIP update message to location server 411 indicating the failure of application server 431. Other status changes that would prompt application server 431 to update border controller 435 include message congestion and traffic congestion, as well as other status changes. Nearly simultaneously, gateway 445, border controller 455, border controller 524, and gateway 465 transmit other update messages to location server 411. Location server 411 receives all of the update messages (Step 510) and assigns a priority to each update message (Step 520). Location server 411 could assign the priority based on several factors such as the originating element or the type of update message (i.e. a failure alert as compared to a general accounting update), as well as several other factors.

In response to entering a period of congestion, location server 411 could process the update messages based on their priority. Thus, messages indicating a failure event would be processed before messages indicating general health statistics of a network element. If not in a period of congestion, location server can process the messages in the order they arrived in a que.

Upon processing the update messages, location server 411 updates stored routing tables (Step 530). For example, had gateway 445 transmitted a failure message indicating that its trunk to PSTN region 440 had failed, location server 411 would have updated its routing table to indicate the failed trunk. If an incoming call was destined for PSTN region 440, location server 411 would instead route the call through PSTN region 460. The call might then possibly traverse a longer route through the PSTN to its eventual destination in PSTN region 440. However, by updating the routing tables, location server 411 at least ensures that the call is completed. In this embodiment, border controller 435 has transmitted an update message indicating the failure of application server 431. Location server updates its stored routing tables to indicate the failure of application server 431.

After processing the update messages, location server 411 floods other location servers with update messages regarding the status of elements in communication with location server 411 (Step 540). Certain elements are assigned to location server 411 and therefore only transmit their update messages to location server 411. However, to propagate correct routing tables throughout a network or across separate networks, location server 411 transmits a flood of update messages to other location servers. In this example, a flood update is transmitted to location server 451. In particular, the update flood includes an update indicating the failed status or state of application server 431.

Figure 6:
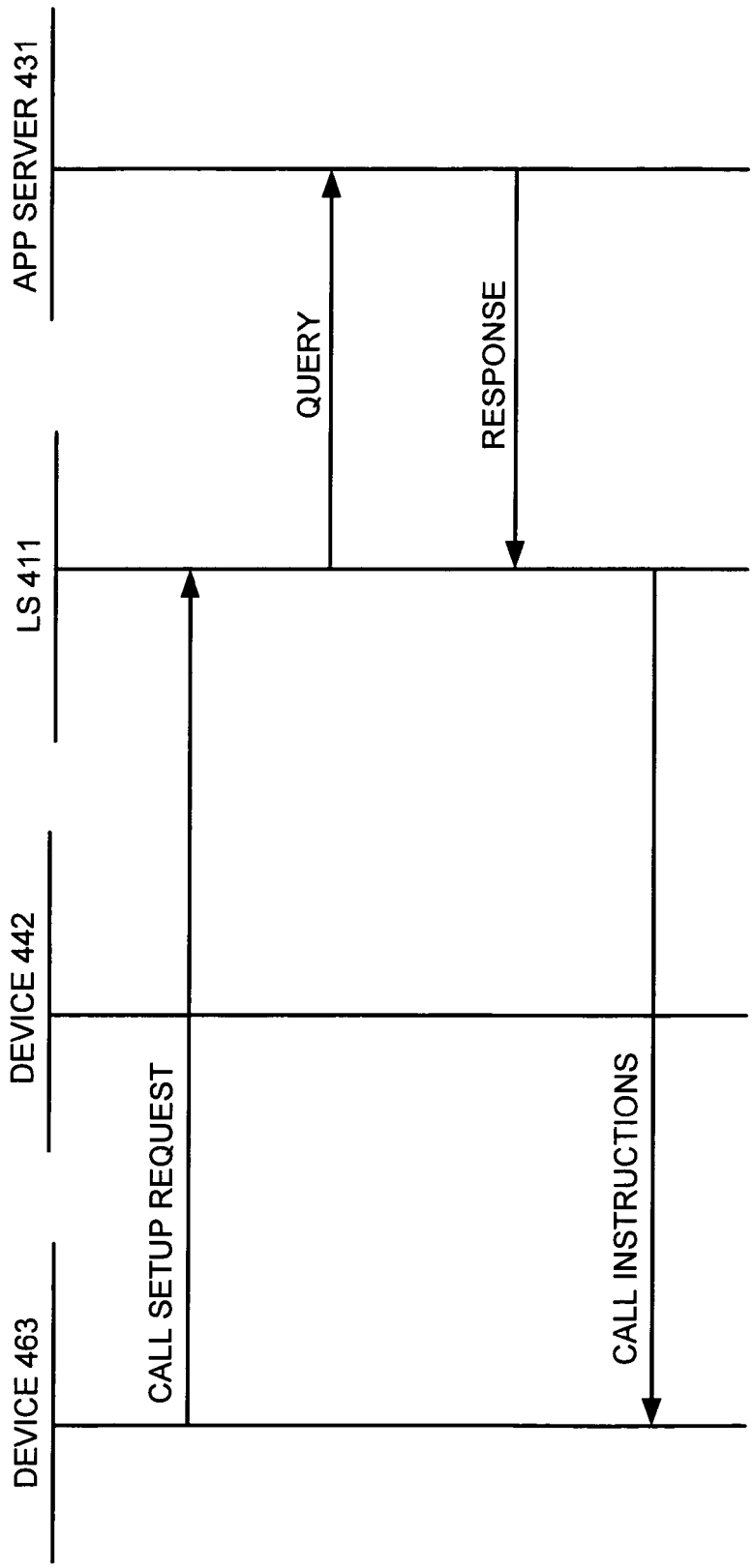
FIG. 6 illustrates the operation of a communication network in an embodiment of the invention.

FIG. 6 illustrates the operation of communication network 400 in an embodiment of the invention. In this embodiment, network elements such as application servers 421 and 431 have updated MGC 411 as to their status as described with respect to FIG. 5. FIG. 6 illustrates a call sequence diagram for a call setup processes from device 463. Device 463 could be a mobile phone, mobile computing device, pager, personal digital assistant, as well as other types of devices. Device 463 utilizes wireless communication standards such as CDMA or GSM, as well as other wireless standards.

Device 463 transmits a call setup request to location server 411. The call setup request is transmitted to and received by base station 462. Base station 462 transfers the call setup request to switch 461. Switch 461 processes the requests and recognizes that the call is from a mobile device and transfers the call request to gateway 465. Gateway 465 converts the call request from a signaling protocol, such as SS7, to a different signaling protocol, such as SIP. Gateway 465 transfers the call request to location server 411. The call request indicates the calling party as well as a called number. Location server processes the call request and recognizes that the calling party is associated with a particular domain with several campuses, such as a university or a corporation, as well as other domains.

Location server 411 accesses a stored routing table to select an appropriate application server for further call processing. The selection is determined based on the status of the several application servers assigned to the particular domain. In this embodiment, it is assumed that application server 421 has a congested status. This means that application server 421 is currently in a period of processing congestion. Further in this embodiment, it is assumed that application server 431 has a clear status and is available for call processing. Location server 411 therefore selects application server 431 for further call processing.

Location server 411 transmits a query to application server 431. The query indicates the calling party and the called number. Application server 431 processes the query in accordance with a dialing rights plan for the calling party to determine if the called number is allowed or not allowed. For example, the called number could be an international number and the calling party could be prohibited from placing international calls. Application server 431 transmits a response to location server 411 indicating call instructions. In this example, the instructions indicate that the call is not allowed because the calling party is not allowed, based on the dialing rights plan, to place international calls. Location server 411 transmits call instructions to device 463 indicating that the call request is denied.

Figure 7:
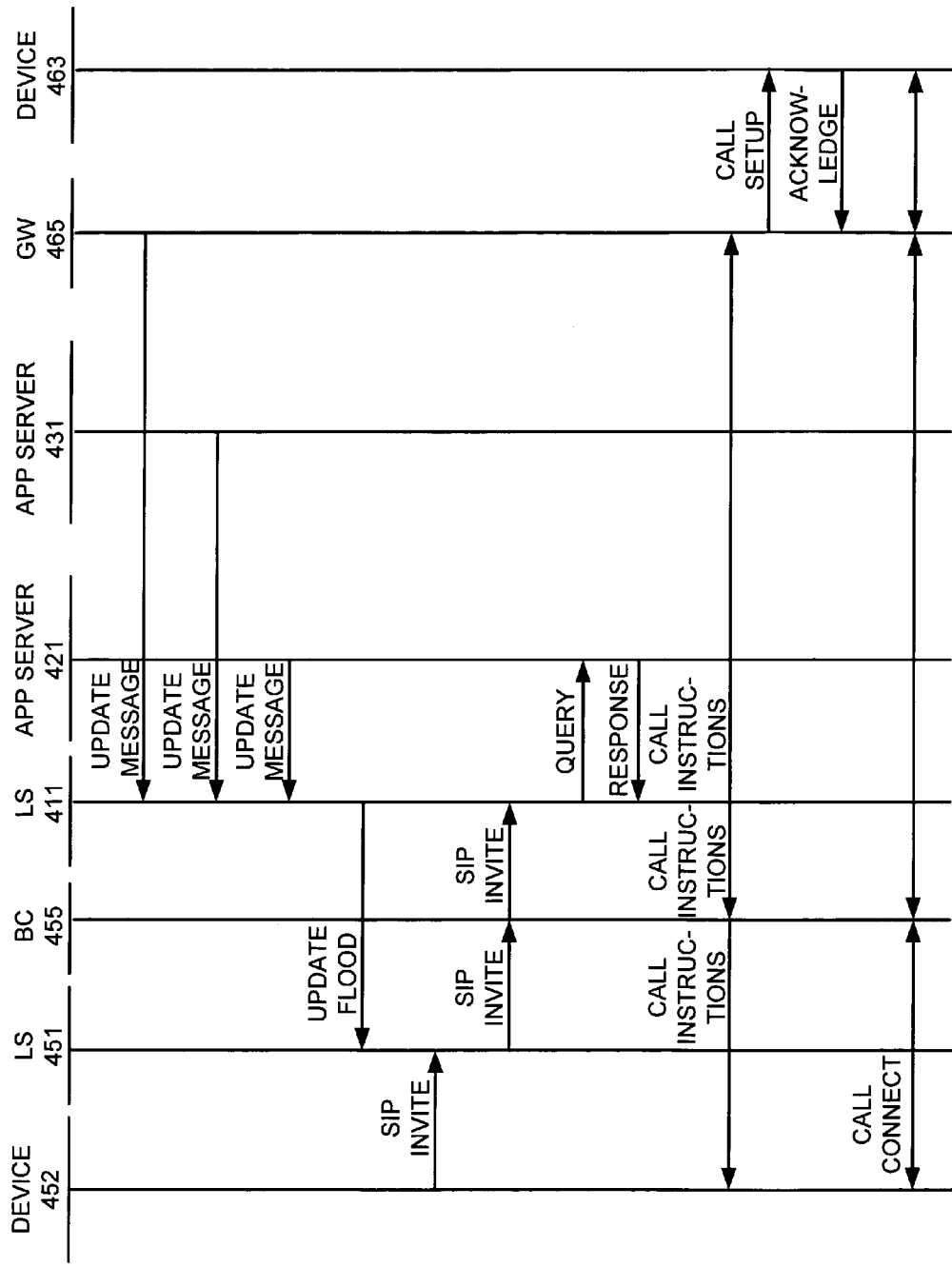
FIG. 7 illustrates the operation of a communication network in an embodiment of the invention.

FIG. 7 illustrates the operation of communication network 400 in an embodiment of the invention. FIG. 7 is a call sequence diagram illustrating an update process and a call setup process. In this embodiment, gateway 465 comprises a TRIP-lite enabled gateway. Location server 411 runs on a SIP proxy and is TRIP enabled. Device 452 is a SIP enabled device. Location server 451 is also SIP and TRIP enabled. Application server 421 and border controller 455 are also TRIP enabled.

To begin, gateway 465 transfers a TRIP update message to location server 411. The update message identifies gateway 465 and indicates the status of gateway 465. In this example, the update message indicates that gateway 465 is healthy and able to receive call traffic. Additionally, application servers 421 and 431 transmit update messages to location server 411. The update message from application server 421 indicates that its status is healthy and it has spare capacity for processing. The update message from application server 431 indicates that it is in a period of congestion and cannot conduct further processing. Location server 411 processes the updates and stores related information in a TRIP routing table. Location server 411 floods other location servers, such as location server 451, with TRIP update messages regarding gateway 465 and application servers 421 and 431. Location server 451 processes the flood update and updates its TRIP routing tables.

Continuing, a user using device 452 desires to place a call to another user using device 463. Device 452 could be a wireless phone, a wireless computing device, a pager, or other types of devices. Similarly, device 463 could be a wireless phone, a wireless computing device, a pager, or another type of device. The call could be a voice call, a data connection, or another type of communication. Device 452 transmits a SIP invite call request to location server 451. The SIP invite indicates the calling party, or user, and the called party. The called party could be identified by a called number or by a user name such as username@domain.com. Location server 451 receives the SIP invite and recognizes the called number as requiring a gateway to PSTN region 460. Location server 451 therefore transfers the SIP request through border controller 455 to location server 411 for call control.

Location server 411 receives the SIP request and processes the request to determine a domain of the calling party. The domain could be determined based on how the user is identified, such as by the identifier callingparty@domain.com. The domain could also be determined by executing a look-up based on a device ID of device 452, as well as by other means. Location server 411 determines that the calling party belongs to a domain having several campuses and that the calling party is subject to a dialing rights plan. The domain has two campus networks 430 and 420. Application server 431 resides in campus network 430 and application server 421 resides in campus network 420. Location server 411 accesses a TRIP routing table that indicates the status of various network nodes such as application servers 421 and 431. Using the routing table, location server 411 determines that application server 421 is the optimal element over application server 431.

Location server 411 next transmits a query to application server 421 indicating the calling party and the called party. The calling party and called party could be identified based on a calling number, a called number, a SIP identification, as well as by other identifying characteristics. Application server 421 receives the query and processes the query to apply a dialing rights plan to the attempted call. Application server 421 determines that the call is allowed based on the dialing rights plan for the calling party. In this case, the call is destined for device 463 in PSTN region 460. In response, application server 421 transmits allowed instructions to location server 411.

To setup the call, application server 411 transmits call routing instructions through border controller 455 to device 452. The routing instructions indicate the address of border controller 455. Location server also transmits instructions to gateway 465 indicating the address of device 452 and border controller 455, and the identity of the destination, device 463. Location server 411 also transmits instructions to border controller 455 indicating the address of device 452 and the address of gateway 465. Gateway 465 converts call signaling for the call to a protocol acceptable by switch 461, such as SS7. Switch 461 performs call setup control to base station 462 to device 463.

Upon call setup completion, a communication is established between device 452 to device 463. When traffic for the call is sent from device 452 to device 463, the traffic is first addressed from device 452 to border controller 455. Border controller 455 routes any traffic having the address of device 452 gateway 465. Gateway 465 interworks the packet traffic from device 452 to a protocol acceptable by switch 461, and transmits the traffic to switch 461. Switch 461 transfers the traffic to base station 462, and base station 462 transmits the traffic to device 463. Gateway 465 also transmits SS7 call signaling for the call to switch 461.

Figure 8:
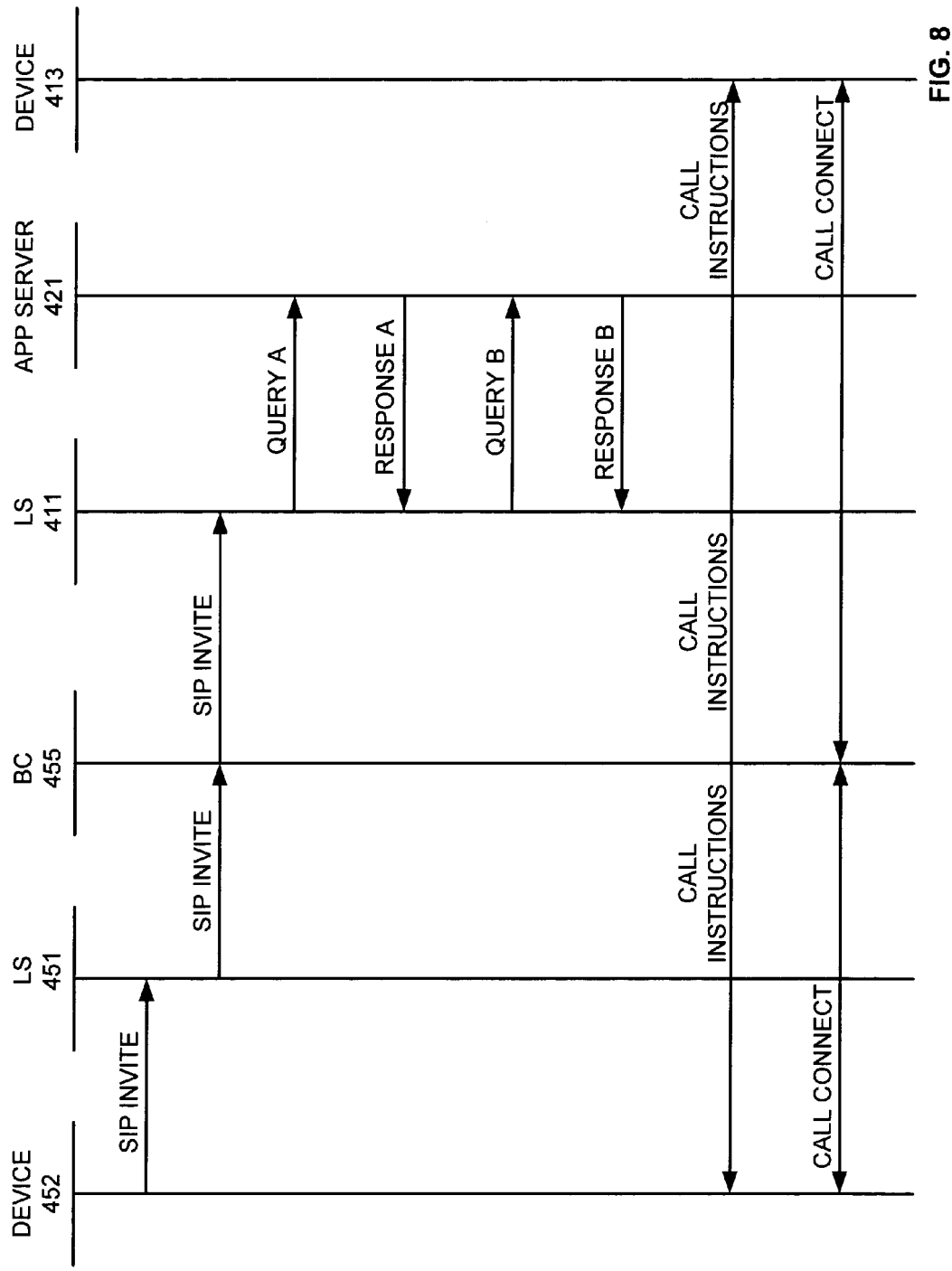
FIG. 8 illustrates the operation of a communication network in an embodiment of the invention.

FIG. 8 illustrates the operation of communication network 400 in an embodiment of the invention. In this embodiment, a dialing rights plan is applied at application server 421 for the calling party and the called part. To begin, device 452 transmits a SIP invite for the call to location server 451. The SIP invite indicates the calling party and the called party by a device ID, a name and domain identifier, such as callingparty@domain.com or calledparty@domain.com, as well as by other characteristics. The domain of the calling party identifies a domain associated with campus networks 430 and 420. Similarly, the domain of the called party identifies campus networks 430 and 420 as associated with the domain. In other words, device 452 belongs to the domain of campus networks 420 and 430. Packet network 450 does not possess a gateway to either campus network 420 or 430. Location server 411 therefore determines to cede control of the call to location server 411.

Location server 451 transmits the SIP invite to border controller 455. Border controller 455 forwards the SIP invite to location server 411. Location server 411 receives the SIP invite and processes the invite to determine the calling and called parties. The called party is identified as using SIP enabled device 413 on packet network 410. Packet network 410 could comprise a voice packet network, such as a Voice over Internet Protocol (VoIP) network. Location server 411 also determines that the calling party belongs to a domain that applies a dialing rights plan to calls placed by the calling party. In response, location server 411 accesses a TRIP routing table to determine which application server of the domain to query for call control. As illustrated above, application server 431 indicated its status as congested and application server 421 indicated its status as clear. Location server selects application server 421 as the optimal application server to apply the dialing rights plan.

Location server 411 transmits a query to application server 421 indicating the calling party and the called party. Application server 421 applies the dialing rights plan for the calling party and transmits a response to location server 411 indicating that the call is allowed. However, the called party also requires application of a dialing rights plan. In response, location server 411 transmits a second query to application server 421 again indicating the calling party and the called party. In this instance, the query also indicates that the subject of the query is the called party, not the calling party. Application server 421 processes the query based on the dialing rights of the called party as opposed to the calling party. Application server 421 then transmits a response to location server 411 indicating that the call is also allowed with respect to the called party.

In an alternative, location server 411 only transmits one query which indicates that processing is required based on both the calling party and the called party. In such as case, application server 421 determines whether or not the call is approved for both the calling party and the called party, and transmits a response to location server 411 indicating the results.

Upon receiving the results from application server 421, location server 411 transmits call instructions to border controller 455, device 452, and device 413. Device 452 routes communications to border controller 455. Border controller 455 recognizes the communications based on the sending address and transmits the communications to device 413. Communications flowing in the direction from device 413 to device 452 are treated in a similar manner.

Figure 9:
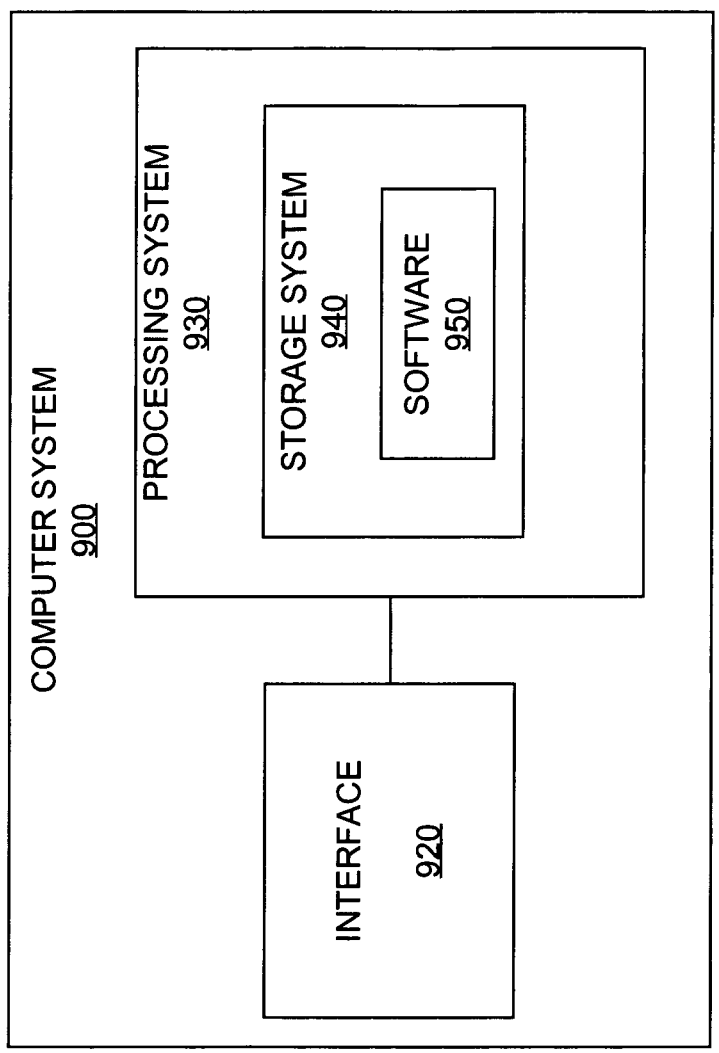
FIG. 9 illustrates a computer system in an embodiment of the invention.

Computer System—FIG. 9

FIG. 9 illustrates computer system 900 in an embodiment of the invention. Computer system 900 includes interface 920, processing system 930, storage system 940, and software 950. Storage system 940 stores software 950. Processing system 930 is linked to interface 920. Computer system 900 could be comprised of a programmed general-purpose computer, although those skilled in the art will appreciate that programmable or special purpose circuitry and equipment may be used. Computer system 900 may use a client server architecture where operations are distributed among a server system and client devices that together comprise elements 920-950.

Interface 920 could comprise a network interface card, modem, port, or some other communication device. Signaling interface 920 may be distributed among multiple communication devices. Interface 930 could comprise a computer microprocessor, logic circuit, or some other processing device. Processing system 930 may be distributed among multiple processing devices. Storage system 940 could comprise a disk, tape, integrated circuit, server, or some other memory device. Storage system 940 may be distributed among multiple memory devices.

Processing system 930 retrieves and executes software 950 from storage system 940. Software 950 may comprise an operating system, utilities, drivers, networking software, and other software typically loaded onto a general-purpose computer. Software 950 could also comprise an application program, firmware, or some other form of machine-readable processing instructions. When executed by the processing system 930, software 950 directs processing system 930 to operate as described for communication networks 100 and 400.

What is claimed is:

1. A media gateway controller in a packet communication network, the media gateway controller comprising:
    an interface configured to receive a first plurality of update messages from a first plurality of application servers of a first enterprise network wherein the first plurality of update messages indicate a status of the first plurality of application servers, receive a second plurality of update messages from a second plurality of application servers of a second enterprise network wherein the second plurality of update messages indicate a status of the second plurality of application servers, and receive a third plurality of update messages from a plurality of gateways wherein the third plurality of update messages indicate a status of the gateways and wherein the interface is configured to receive a call setup request for a call wherein the call setup request indicates a calling party and a one of the first and second enterprise networks;
    a processor configured to process the update messages to update a routing table based on the status of the first and second plurality of application servers and the plurality of gateways, wherein the processor is further configured to process the call setup request to select the first plurality of application servers based on the one enterprise network indicated in the call setup request and select the one application server of the first plurality of application servers based on the status of the first plurality of application servers; and
    wherein the interface is further configured to transfer a query indicating the calling party to the one application server and to receive a response from the one application server indicating whether the call is allowed based on a calling plan for the calling party stored by the one application server.

2. The media gateway controller of claim 1 wherein the interface is further configured to receive a response from the one application server indicating first instructions for the call and transfer second instructions for the call.

3. The media gateway controller of claim 2 wherein the processor is further configured to process the first instructions for the call to determine second instructions for the call.

4. The media gateway controller of claim 3 wherein the first instructions indicate that the call is allowed based on a calling plan for the calling party.

5. The media gateway controller of claim 4 wherein the second instructions indicate routing instructions for the call.

6. The media gateway controller of claim 3 wherein the first instructions indicate that the call is not allowed based on a calling plan for the calling party.

7. The media gateway controller of claim 1 wherein the update messages comprise Telephony Routing over Internet Protocol (TRIP) update messages.

8. The media gateway controller of claim 1 wherein the routing table comprises a Telephony Routing over Internet Protocol (TRIP) routing table.

9. A method of operating a media gateway controller in a packet communication network, the method comprising:
    in an interface, receiving a first plurality of update messages from a first plurality of application servers of a first enterprise network wherein the first plurality of update messages indicate a status of the first plurality of application servers, receiving a second plurality of update messages from a second plurality of application servers of a second enterprise network wherein the second plurality of update messages indicate a status of the second plurality of application servers, and receiving a third plurality of update messages from a plurality of gateways wherein the third plurality of update messages indicate a status of the gateways and wherein the interface is configured to receive a call setup request for a call wherein the call setup request indicates a calling party and a one of the first and second enterprise networks;
    in a processor, processing the update messages to update a routing table based on the status of the first and second pluralities of application servers and the plurality of gateways, wherein the processor is further configured to process the call setup request to select the first plurality of application servers based on the one enterprise network indicated in the call setup request and select the one application server of the first plurality of application servers based on the status of the first plurality of application servers; and
    wherein the interface is further configured to transfer a query indicating the calling party to the one application server and to receive a response from the one application server indicating whether the call is allowed based on a calling plan for the calling party stored by the one application server.

10. The method of claim 9 further comprising, in the interface, receiving a response from the one application server indicating first instructions for the call and transferring second instructions for the call.

11. The method of claim 10 further comprising, in the processor, processing the first instructions for the call to determine second instructions for the call.

12. The method of claim 11 wherein the first instructions indicate that the call is allowed based on a calling plan for the calling party.

13. The method of claim 12 wherein the second instructions indicate routing instructions for the call.

14. The method of claim 11 wherein the first instructions indicate that the call is not allowed based on a calling plan for the calling party.

15. The method of claim 9 wherein the update messages comprise Telephony Routing over Internet Protocol (TRIP) update messages.

16. The method of claim 9 wherein the routing table comprises a Telephony Routing over Internet Protocol (TRIP) routing table.

\* \* \* \* \*